United States Patent
Berenson

[11] 3,879,550
[45] Apr. 22, 1975

[54] 3,5-BIS(4-PYRIDYLMETHYL)-2H-13,5-TETRAHYDROTHIODIAZINE-2-THIONE USED AS A FUNGICIDE

[75] Inventor: Herman Berenson, Trenton, N.J.

[73] Assignee: American Cyanamid Company, Stamford, Conn.

[22] Filed: May 2, 1973

[21] Appl. No.: 356,522

[52] U.S. Cl. .............................................. 424/246
[51] Int. Cl.² ........................................ A01N 9/12
[58] Field of Search .................................... 424/246

[56] References Cited
OTHER PUBLICATIONS
Chemical Abstracts 72:30085k (1970).

*Primary Examiner*—Albert T. Meyers
*Assistant Examiner*—Leonard Schenkman
*Attorney, Agent, or Firm*—Harry H. Kline

[57] ABSTRACT

There is provided a method for protecting organic materials, particularly agricultural crops from attack by fungi by applying to said materials an effective fungicidal amount in the range of from one to three pounds per acre of the compound:

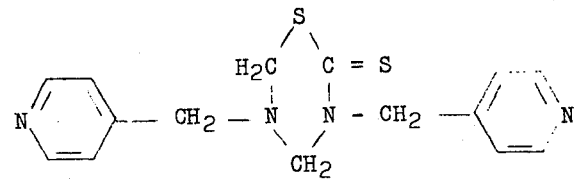

4 Claims, No Drawings

3,5-BIS(4-PYRIDYLMETHYL)-2H-13,5-TETRAHYDROTHIODIAZINE-2-THIONE USED AS A FUNGICIDE

BACKGROUND OF THE INVENTION

The term "fungicidal method" as used in this specification and in the claims is meant to include not only a method of destroying fungi but also the process of inhibiting the germination of the spores of fungi.

Some methods of the past have not been entirely satisfactory for this purpose on agricultural crops because of the toxicity of the materials used.

Other materials are phytotoxic particularly when applied at concentrations somewhat higher than recommended and have limited use because application during warm weather or in warm climates results in excessive crop injury. Still other materials are reported to decompose during storage, or while on the plant, giving rise to materials which are harmful to humans. Others are highly specific in their activity, controlling a restricted number of plant pathogenic fungi and requiring the use of additional fungicides to protect crops against a broad spectrum of fungi.

There is a need for a fungicide which will not be phytotoxic when applied at concentration higher than those necessary to control a broad spectrum of fungi on economic crops even under diverse weather or climate conditions. Such a material would provide a wider margin of safety in the event of inadvertance by the person making the application or mechanical failure of the application equipment.

There is a need for such a material on important economic crops such as potatoes, tomatoes, cucumbers, apples and rice to protect the crops against the diseases of potato blight, tomato late blight, cucumber anthracnose, apple scab and rice blast, respectively.

It is, therefore, an object of this invention to provide a method for controlling fungi on plants which will be commercially acceptable because of lower phytotoxicity, which will be acceptable under diverse weather and climatic conditions, which will be acceptable for use against a broad spectrum of plant pathogenic fungi, and which will afford greater human safety.

These and other objects are fulfilled by the application to living plants of fungicidally effective amounts 3,5-bis(4-pyridylmethyl)-2H-1,3,5-tetrahydrothiadiazine-2-thione, all as disclosed hereinafter.

The antifungal properties of the tetrahydro-2H-1,3,5-thiadiazine-2-thiones were disclosed by Rieche et al (Arch. Pharmaz. 293, 957(1960) and 296, 770(1963) and later confirmed by Schorr et al (Arzneimittel Forschung 19, 1807(1969). Schorr et al conducted various chemotherapentic studies with many tetrahydro-2H-1,3,5-thiadiazine-2-thiones which proved to be biologically interesting as a class because of their activity against fungi and bacteria. The tetrahydro-1,3,5-thiadiazine-2-thione reported by Schorr which may be considered as the closest prior art is 3,5-bis(3-pyridylmethyl)-2H-1,3,5-tetrahydrothiadiazine-2-thione.

SUMMARY

According to the present invention it has been found that the application of 3,5-bis(4-pyridylmethyl)-2H-1,3,5-tetrahydrothiadiazine-2-thione on agricultural plants produces excellent fungicidal activity with low damage to the host plant.

The fungicide of my invention, 3,5-bis(4-pyridylmethyl)-2H-1,3,5-tetrahydrothiadiazine-2-thione, may be represented by the following structural formula:

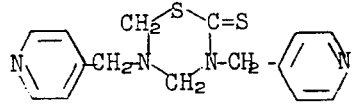

The 3,5-bis(4-pyridylmethyl)-2H-1,3,5-tetrahydrothiadiazine-2-thione (I) is readily synthesized by reacting one mole of 4-aminomethylpyridine with 1 mole of carbon disulfide in the presence of sodium hydroxide to form the sodium salt of the corresponding dithiocarbamic acid and further reacting one mole of this product with 2 moles of formaldehyde and one mole of 4-aminomethylpyridine hydrochloride.

The fungicidal methods of the present invention involve contacting the locus area where fungicidal control is desired with a fungicidally effective amount of the fungicide compound (I) of the present invention. Application of the active ingredient at a rate of from between about 0.03 pounds to about 4 pounds per acre applied at the rate of 100 gallons per acre, is generally sufficient to achieve the desired fungus control.

For application of compound (I) it is generally preferred to employ (I) in combination with conventional adjuvants and formulation aids. It may be advantageously employed with the use of either solid or liquid adjuvants and applied in the form of dusts, dust concentrates granulars, wettable powders, dispersions and the like.

Field application of these formulations may be made by conventional equipment, such as power dusters, boom and hand sprayers, spray dusters, addition to irrigation water, and the like. Application to seeds may be made by tumbling or slurrying.

The active ingredient may be initially formulated as a concentrated composition comprising the active ingredient in a solid or liquid adjuvant which serves as a formulation aid or conditioning agent, thus permitting the concentrates to be subsequently mixed with a suitable solid or liquid carrier.

Useful liquid adjuvants in which compound (I) is dissolved, suspended or distributed include, for example, water, xylene, benzene, lower alcohols $C_1$–$C_4$, fuel oil or the like, with or without an emulsifying agent. For application the resulting solution can be further diluted with either water or an organic diluent, such as deodorized kerosene. Concentrations in the range of from about 5% to about 95% are generally suitable for initial solution. When diluted for application, suitable solutions may contain the active ingredient in concentrations of from about 50 ppm to about 4,800 ppm, i.e. .04 pounds to 4 pounds per acre.

Dusts are generally prepared by grinding together from about 0.5% to 20% by weight of 3,5-bis(4-pyridylmethyl)-2H-1,3,5-tetrahydrothiadiazine-2-thione with a finely divided inert diluent such as attapulgite, kaolin, diatomaceous earth, talc or fuller's earth. Preferably, the dust contains from about 5 to 10% by weight of said compound with about 95 to 90% by weight of inert diluent. These formulations can then be applied with dusting equipment to the foliage of agronomic crops or fields, meadows, forests or the like which are to be protected from fungi or where control of fungi is desired. Application is generally sufficient to provide between about 0.03 pounds and 4 pounds per acre of active material.

Dust concentrates are usually prepared in the same manner as dusts but generally from about 25 to 75% by weight of the active material and from 75 to 25% by weight of diluent are used.

An alternative process for preparation of dusts, also dust concentrates, involves blending the active ingredient with the solid carrier and passing the uniform blend through an attrition mill to obtain the desired particle size.

A granular formulation can be prepared by blending a small amount, i.e. about 0.3% by weight, of a fumed colloidal silica with about 5.6% by weight of the active ingredient and air-milling the mixture to a uniform blend. Silica sand, about 85.7% by weight, is then placed in a blender along with about 0.7% by weight of calcium-sodium lignin sulfonate powder and 4.2% of a 1% aqueous solution of calcium-sodium lignin sulfonate. The mixture is blended and then 3.5% by weight of synthetic calcium silicate is added. The mixture is permitted to continue blending for several minutes until the finished product is uniformly coated and free flowing. It is, of course, obvious that the amount of active ingredient in the formulated granular product can be widely varied, preferably between about 0.1% to 5% by weight. This simply requires appropriate adjustment of the amount of granular carrier used and/or adjuvants added. It is likewise obvious that sorptive granular carriers, as well as non-sorptive carriers, can be employed in the preparation of the granular formulations.

Wettable powders can be prepared by blending compound (I) with a solid carrier, such as attapulgite, kaolin, diatomaceous earth, silica, or the like, and a small amount of a dispersing agent either with or without a wetting agent and air-milling the blended mixture to effect reduction of particle size to about the 5 to 10 micron range. A typical wettable powder might contain between about 25% to 85% by weight of compound (I), 5% by weight of a highly purified partially desulfonated sodium lignin sulfonate, 1% by weight of sodium N-methyl-N-oleoyltaurate and 44% by weight of attapulgite.

In practice, it will also be found that the active ingredient in the above formulation can be varied from about 25 to 80% by weight. However, in such case, the solid diluent will have to be varied accordingly. In practice, the wettable powders are generally dispersed in water and applied as a dilute spray to the vegetation or locus where fungus control is desired.

Polyethylene glycols, methoxy polyethylene glycols, sodium lignosulfonate, calcium dodecylbenzene sulfonate and the like are among the emulsifying agents and dispersing agents which can be used in these formulations.

It is obvious that dusts can also be prepared from wettable powders. For example, to prepare a 10 dust 20% by weight of a 50% wettable powder can be blended with about 80% by weight of a solid carrier, such as kaolin. Suitable equipment for such preparations are ribbon-type blenders and double-cone blenders. It is also obvious that the concentration of active ingredient in such dust formulations can be readily varied by adjusting the amount of wettable powder and carrier used. Such dusts will generally vary between about 1% to 15% by weight of active ingredient, although higher or lower concentrations may also be prepared.

The application of 3,5-bis(4-pyridylmethyl)-2H-1,3,5-tetrahydrothiadiazine-2-thione to plants or foliage may be effected by spraying either a solution of the material in a suitable solvent, such as aqueous acetone, or by spraying a dispersion of the material in a suitable non-miscible solvent such as water, xylene or a highly aromatic naphtha. The general term dispersion, as used herein, incudes dispersions of either solid particles or immiscible liquid droplets. The latter type of dispersion is more particularly referred to as an emulsion.

Although a wide range of active ingredient to liquid diluent may be used in the dispersion of solid materials, ratios of active ingredient ot diluent which may be employed range from 1:99 to 95:5. We have found that applications of such dispersions at application spray rates of 50 ppm to 4,800 ppm may be used, i.e. 0.04 pounds to 4 pounds per acre. Preferably, the spray rate of application is 250 ppm to 2,400 ppm, i.e. 0.2 pounds to 2 pounds per acre.

In the preparation of a dispersion of solid particles it is preferable to include a dispersing agent to promote the separation or deflocculation of the particles of the active ingredient. Examples of such dispersing agents are sodium lignosulfonate, calcium lignosulfonate, the sodium salt of naphthalene sulfonic acid condensed with formaldehyde, the sodium salts of polymeric carboxylic acids, the sodium salts of carboxylated polyelectrotytes, and the like.

The application of 3,5-bis(4-pyridylmethyl)-2H-1,3,5-tetrahydrothiadiazine-2-thione in the form of an emulsified dispersion may also be advantageous. The emulsified dispersion may be of the oil-in-water type, of the so-called invert (water-in-oil) type. The preferred oil-in-water emulsion is formed by dissolving the aforementioned compound in a suitable water-immiscible solvent slowly admixing the solution with water which contains an emulsifying agent.

Other formulations, methods, products and advantages of the present invention may become apparent from the examples set forth hereinafter. These examples are provided simply as an illustration of the invention and are not intended to be limiting thereof. Parts and percentages herein are by weight unless otherwise indicated. In the case of 3,5-bis(4-pyridylmethyl)-2H-1,3,5-tetrahydrothiadiazine-2-thione trihydrate the parts by weight represent the amount of unhydrated material.

EXAMPLE 1

Preparation of
3,5-Bis(4-pyridylmethyl)-2H-1,3,5-tetrahydrothiadiazine-2-thione

Carbon disulfide (7.6 g, 0.10 mole) is added to a cold (10°C.) mixture of sodium hydroxide (4.0g, 0.10 mole) and 4-aminomethylpyridine (10.8g, 0.10 mole) in 40 mls of water and 50 mls of acetonitrile. The mixture is allowed to stir for 1 hour at 20–27°C., then cooled to 20°C. and an aqueous formaldehyde solution (16.2g, of 37% solution, 0.20 mole) is added. An aqueous solution of 4-aminomethylpyridine hydrochloride, prepared by reacting 10.8g of 4-aminomethylpyridine and 8.3 ml of 36% hydrochloric acid in 40 ml of water, is added and the mixture is stirred for 1 hour at 20–25°C.

The solution is extracted with chloroform and the dried extract is concentrated to leave 29.4g of the crude product, which is recrystallized three times from acetone to give pure tetrahydro-3,5-bis(4-pyridylmethyl)-2H-1,3,5-thiadiazine-2-thione, a white solid melting at 141°–144°C. The structure is established by IR and NMR spectra and elemental analysis.

Anal. Calcd. for $C_{13}H_{16}N_4S_2$: C, 56.93; H, 5.10; N, 17.71.
Found: C, 57.26; H, 5.12; N, 17.80.

EXAMPLE 2

Preparation of 3,5-Bis(4-pyridylmethyl)-2H-1,3,5-tetrahydrothiadiazine-2-thione trihydrate The procedure of Example 1 is used except that the product is isolated as the trihydrate by adding a seed crystal to the reaction mixture. The resulting precipitate of tetrahydro-3,5-bis(4-pyridylmethyl)-2H-1,3,5 thiadiazine-2-thione trihydrate is filtered off, washed with aqueous acetonitrile and water and dried in air. The trihydrate is identified by IR and NMR spectra, and by its subsequent conversion to the anhydrous product.

EXAMPLE 3

Preparation of 3,5 Bis(2-pyridylmethyl)-2H-1,3,5-tetrahydrothiadiazine-2-thione

Carbon disulfide (7.6g.0.10 mole) is added to a cold (10°C.) solution of 2-aminomethylpyridine (10.8g., 0.10 mole) and sodium hydroxide (4.0g., 0.10 mole) in 40 ml of water and 50 ml of acetonitrile. The cooling bath is removed and the solution allowed to stir at 25°C. for 1 hour. The solution is then cooled to 20°C. and aqueous formaldehyde solution (16.2g. of 37% solution, 0.20 mole) is added, and finally an aqueous solution of 2-aminomethylpyridine hydrochloride (from 10.8g., 0.10 mole, of amine and 8.3 ml of conc. hydrochloride acid in 50 ml of water) is added. The resulting mixture is stirred at 25°C. for 1 hour, and is then extracted with 200 ml. of methylene chloride. The extract is dried over anhydrous magnesium sulfate and chromatographed on a column of 700 g of basic alumina with methylene chloride and ethyl acetate as elutants to give an orange oil which is crystallized from acetone/2-propanol solution to give impure solid product. Recrystallization from acetone/2-propanol solution gives a white solid product, mp 70–75°C. Another recrystallization as before gives analytically pure product, mp 70.5–75°C.

Anal. Calcd. for $C_{13}H_{16}N_4S_2$: C, 56.93; H, 5.10; N, 17.71.
Found: C, 57.04; H, 4.98; N, 17.73.

The structure of the compound was confirmed by NMR and IR spectral analysis.

EXAMPLE 4

Preparation of 3,5-Bis(3-pyridylmethyl)-2H-1,3,5-tetrahydrothiadiazine-2-thione.

Carbon disulfide (15.2g. 0.20 mole) is added to a cooled stirred solution of 3-aminomethylpyridine (21.6g, 0.20 mole) in acetonitrile (100 ml). Aqueous sodium hydroxide (8.0 g 0.20 mole, in 72 ml $H_2O$) is added to the cooled (ice bath) mixture. Then the ice bath is removed and the mixture allowed to stir at 25°C. for 1¼ hours. The reaction mixture is then cooled to 20°C. and aqueous formaldehyde solution (32.5g of 37% solution, 0.40 mole) is added and finally an aqueous solution of 3-aminomethylpyridine hydrochloride (from 21.6g, 0.20 mole, of amine and 100 ml of 2N hydrochloric acid) is added. After being stirred at 25°C. for 1 hour the mixture is adjusted to pH 7–8 by the addition of base, diluted with 800 ml of water, extracted with methylene chloride and the extract is dried over anhydrous magnesium sulfate. The dried extract is concentrated in a rotary evaporator to leave a hard white solid which is recrystallized from acetone-acetonitrile solution to give the product, mp 128.5–131.5°C. (Schorr et al, Arzneimittel Forschung, 19, 1807(1969 give mp 128–130°C. for this compound).

For analysis the sample is recrystallized as before to give the pure product, mp 129–133°C.

Anal. Calcd. for $C_{13}H_{16}N_4S_2$: C, 56.93; H, 5.10; N, 17.71
Found: C, 57.02; H, 5.29; N, 17.81

The structure of the compound was confirmed by NMR and IR spectral analyses.

EXAMPLES 5 – 7

In these examples 3,5-bis(4-pyridylmethyl)-2H-1,3,5-tetrahydrothiadiazine-2-thione was compared with 3,5-bis(2-pyridylmethyl)-2H-1,3,5-tetrahydrothiadiazine-2-thione and 3,5-bis(3-pyridylmethyl)-2H-1,3,5-tetrahydrothiadiazine-2-thione for fungicidal activity against *phytophthora infestans*, *Colletotrichum lagenarium*, *Piricularia oryzae* and *Venturia inequalis* which cause the diseases of tomato late blight, cucumber anthracnose, rice blast and apple scrab, respectively.

In carrying out this test, the inoculms referred to above are prepared and used as follows:
Inoculum Production and Use
1. *P. infestans*:

The culture is grown in 500 ml Erlenmeyer flasks, stoppered with a non-absorbent cotton plug, on a medium consisting of:

| | |
|---|---|
| Wheat seeds | 50 ml |
| Deionized Water | 50 ml |

The medium is sterilized by autoclaving for 45 minutes at 121°C. A second sterilization is carried out for 15 minutes at 121°C. on the day of use and at least 2 days after the initial one. Innoculation is by mass transfer from a 5-day old culture and is made weekly. Inoculated flasks are incubated at 23°C. for 10–14 days.

For use, P. infestans spores and/or hyphae are suspended in 100 ml deionized water and filtered through a fine mesh screen to remove coarse particles.

2. *P. oryzae*

The culture is grown in 250 ml Erlenmeyer flasks, stoppered with a non-absorbent cotton plug, on a medium consisting of:

| | |
|---|---|
| Barley | 12 g |
| Deionized Water | 15 ml |

The medium is sterilized as in 1, above. Inoculation is by mass transfer from a 10-day old culture and is made weekly. Inoculated flasks are incubated 10–14 days under a constant source of fluorescent light. For use, the spores and/or hyphae are suspended by shaking with 60 ml deionized water and filtering through a fine mesh screen.

3. *C. lagenarium*

The culture is grown on potato dextrose agar, in Petri dishes, prepared as follows:

| | |
|---|---|
| Potato, peeled and diced | 300 g. |
| Deionized Water | 1000 ml |

Cook potatoes in 500 ml water by autoclaving 30 minutes at 121°C. Filter through cheese cloth and make the volume to 1000 ml. Add:

| | |
|---|---|
| Agar, Bacto-Difco | 15 g |
| Dextrose | 20 g. |

Sterilize by autoclaving for 20 minutes at 121°C. Dispense about 20 ml, aseptically, into Petri dishes and allow to solidify. Inoculation is by mass transfer of spores, on a flamed needle, from a 3-or 4-day old culture and is made every 3 or 4 days.

To use *C. lagenarium*, a strip of agar and fungus, about 0.5 inch wide, is removed and the spores and/or hyphae suspended in water by scraping with a glass rod.

4. *V. inequalis*

Infected leaves, well-covered with V. inequalis spores are stored at −20°C. in heat-sealed plastic bags. Spores from 4–8 leaves are dislodged by shaking with 100 ml deionized water.

The described inoculums are usually sufficient to inoculate 50–100 of the respective host plants.

The compounds to be applied, 3,5-bis(2-pyridylmethyl)-2H-1,3,5-tetrahydrothiadiazine-2-thione, 3,5-bis(3-pyridylmethyl)-2H-1,3,5-tetrahydrothiadiazine-2-thione, and 3,5-bis(4-pyridylmethyl)-2H-1,,3,5-tetrahydrothiadiazine-2-thione respectively, were dissolved in 66% aqueous acetone to effect solution. Tomato, cucumber, rice and apple plants were sprayed with the solutions of the subject compounds at spray concentration levels of 1,000 ppm to the point of runoff and then allowed to dry for several hours. The dried plants were then inoculated with the above-mentioned plant pathogenic fungi and put into a cabinet at 65–70°F and 90% relative humidity for 4 days. At the end of this period the plants were removed from the cabinet and placed in a greenhouse to allow the disease to express itself as dried, diseased tissue of the host.

The results obtained with the above-mentioned 2H-1,3,5-tetrahydrothiadiazine-2-thiones as presented in Table I show that the application of 3,5-bis(2-pyridylmethyl)-2H-1,3,5-tetrahydrothiadiazine-2-thione (Example 5) results in very slight fungicidal activity, whereas the applications of both 3,5-bis(3-pyridylmethyl)-2H-1,3,5-tetrahydrothiadiazine-2-thione and 3,5-bis(4-pyridylmethyl)-2H-1,3,5-tetrahydrothiadiazine-2-thione (Examples 6 and 7) show excellent fungicidal activity on all plants.

TABLE I

Foliar Disease Control at 1,000 ppm By 2H-1,3,5-Tetrahydrothiadiazine-2-thiones

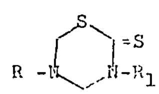

| Example No. | R | Tomato Late Blight | Cucumber Anthracnose | Rice Blast | Apple Scab | Comments (a) |
|---|---|---|---|---|---|---|
| | | Disease Control In Indicated Tests | | | | |
| 5 | 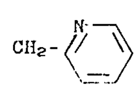  | 1 | 0 | 0 | 3 | At 100 ppm: Very slight activity vs. AS; no activity vs. LB, CA, RB. |
| 6 |  | 3 | 3 | 3 | 3 | At 100 ppm: Generally, good activity vs. LB, CA, RB, AS. |
| 7 | 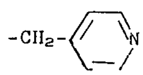  | 3 | 3 | 3 | 3 | At 100 ppm: Generally, good activity vs. LB, CA, RB, AS. |

(a) 0 equals no control; 1 equals slight control of disease; 3 equals no disease
LB-Tomato late blight
CA-Cucumber anthracnose
RB-Rice blast
AS-Apple scab

EXAMPLES 8 – 17

Tomato and cucumber plants at the two-leaf stage were sprayed to the point of runoff with 100 mls. of 3,-5-bis(3-pyridylmethyl)-2H-1,3,5-tetrahydrothiadiazine-2-thione and 3,5-bis(4-pyridylmethyl)-2H-1,3,5-tetrahydrothiodiazine-2-thione, respectively, at concentration levels of 1,200, 1,800, 2,400 and 3,600 ppm in 66% aqueous acetone. There were six specimens of each plant species. A control consisting of a like number of plants similarly sprayed with 100 mls of 66% aqueous acetone was also included.

Immediately after the spray applications all plants were transferred to the greenhouse for 4 hours to permit the leaves to dry. When dry the plants were transferred to a cabinet maintained at 65–67°F and 90% relative humidity. While these conditions permit the development of such diseases as tomato late blight and cucumber anthracnose the subject plants were not infected with these diseases. After storing for 4 days in the cabinet the plants were transferred to the greenhouse and examined for chemical injury. The results of the tests, as recorded in Table II, demonstrate that the use of 3,5-bis(4-pyridylmethyl)-2H-1,3,5-tetrahydrothiodiazine-2-thione provides a three-fold safety factor against human or mechanical error over the use of 3,5-bis(3-pyridylmethyl)-2H-1,3,5-tetrahydrothiodiazine-2-thione.

It should be understood that applying the active compound at levels of 1,200, 1,800, 2,400 and 3,600 ppm at 100 gals/ acre is equivalent to applying 1, 1.5, 2 and 3 lbs/acre of active material, respectively.

TABLE II

Chemical Injury Induced by 2H-1,3,5-Tetrahydrothiadiazine-2-thiones

| Example | $R_1$ | level PPM | Tomato Plants | Cucumber Plants |
|---|---|---|---|---|
| 8 | 3-pyridyl-$CH_2$- | 1200 | 6/6 plants stunted; 6/6 trace to severe injury | 5/6 trace to moderate chlorosis; 1/6 severe chlorosis |
| 9 | 4-pyridyl-$CH_2$- | 1200 | 0/6 plants stunted; occassional minor spotting | 3/6 no injury; 3/6 trace to moderate chlorosis |
| 10 | 3-pyridyl-$CH_2$- | 1800 | 6/6 plants stunted and yellowed; 2/6 severe necrosis | 6/6 slight to severe chlorosis; 3/6 necrosis |
| 11 | 4-pyridyl-$CH_2$- | 1800 | 0/6 plants stunted; occassional minor spotting | 6/6 no injury |
| 12 | 3-pyridyl-$CH_2$- | 2400 | 1/6 very severe stunting and injury; 5/6 killed | 2/6 severe chlorosis and necrosis; 4/6 killed |
| 13 | 4-pyridyl-$CH_2$- | 2400 | 0/6 stunted; 6/6 occassional minor spotting | 2/6 no injury; 3/6 slight chlorosis; 1/6 moderate chlorosis & stem injury |
| 14 | 3-pyridyl-$CH_2$- | 3000 | 3/6 very severe injury; 3/6 killed | 5/6 severe chlorosis and necrosis; 1/6 killed |
| 15 | 4-pyridyl-$CH_2$- | 3000 | 0/6 stunting; occassional minor spotting | 5/6 minor chloratic spots; 1/6 severe chlorosis |

TABLE II - Continued

Chemical Injury Induced by 2H-1,3,5-Tetrahydrothiadiazine-2-thiones

| Example | $R_1$ | level PPM | Tomato Plants | Cucumber Plants |
|---|---|---|---|---|
| 16 | 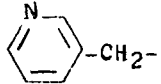 | 3600 | 5/6 slight to severe injury<br>1/6 killed | 1/6 moderate stunting and chlorosis<br>3/6 severe stunting and chlorosis<br>2/6 killed |
| 17 | 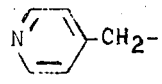 | 3600 | 3/6 no injury<br>3/6 moderate injury | 2/6 no injury<br>4/6 trace to slight chlorosis |

EXAMPLES 10 – 13

Two-three week old tomato plants (cv. Bonny Best), cucumber plants (cv. Ashley) and rice plants (cv. NATO) were sprayed to run-off with graded concentrations of the aqueous dispersions described in Table III below, each of the graded concentrations was replicated 3 times and each treatment consisted of a single specimen of the 2 broad-leaf species and of 20–30 rice plants. Untreated controls were exposed to the fungi under identical conditions. The results are given in Table IV. After the spray deposit dried, plants were inoculated with a pooled, conidial suspension of the tomato late blight fungus (*phytophthora infestans*) cucumber anthracnose fungus (*colletotrichum lagenarium*) and the rice blast fungus (*piricularia oryzae*). Plants were then transferred to a controlled temperature/humidity cabinet maintained at 20°C. and 95% rh. Plants were held under these conditions for 4-days to permit infection, then transferred to the greenhouse to await expression of disease symptoms. Plants were rated for disease severity 11 days after infection.

TABLE III

Compositions of Aqueous Dispersions

| | Percent Compositions | | |
|---|---|---|---|
| | Formulation 1 | Formulation 2 | Formulation 3 |
| Product of Ex. 2 (85% real) | 58.5 | 59.0 | 59.0 |
| Kaolin clay | — | 28.0 | 25.0 |
| Marasperse, N-22[a] | — | 3.0 | 3.0 |
| Hi-sil 233[b] | 20.0 | 10.0 | 10.0 |
| Triton B-1956[c] | — | — | 3.0 |
| Ioepon T-77[d] | 5.0 | — | — |
| Celite 209[e] | 15.5 | — | — |
| Aerosol OT-B[f] | 1.0 | — | — |

[a] An alkali lignosulfonate
[b] Hydrated silicon dioxide
[c] A modified phthalic glyceral alkyl resin
[d] An alkali N-methyl-N-oleoyltaurate
[e] A diatomaceous earth
[f] A dioctylalkali sulfosuccinate

TABLE IV

Foliar Disease Control Using Aqueous Dispersions of 3,5-Bis(4-pyridylmethyl)-2H-1,3,5-tetrahydrothiadiazine-2-thione

| Example | Treatment | Spray Rate ppm | Tomato Late Blight | Degree of Disease[a] Cucumber Anthracnose | Rice Blast |
|---|---|---|---|---|---|
| 18 | Formulation 1 | 500 | Slight | Heavy | Slight |
| | Formulation 1 | 100 | Slight | Dead | Heavy |
| | Formulation 1 | 50 | Moderate | Dead | Heavy |
| | Formulation 1 | 25 | Moderate | Dead | Severe |
| 19 | Formulation 2 | 500 | Slight | Slight | Moderate |
| | Formulation 2 | 100 | Trace | Dead | Moderate |
| | Formulation 2 | 50 | Slight | Dead | Severe |
| | Formulation 2 | 25 | Moderate | Dead | Severe |
| 20 | Formulation 3 | 500 | Heavy | Moderate | Moderate |
| | Formulation 3 | 100 | Moderate | Dead | Severe |
| | Formulation 3 | 50 | Moderate | Dead | Heavy |
| | Formulation 3 | 25 | Heavy | Dead | Dead |
| 21 | Control | — | Severe | Dead | Dead |

[a] In order of increasing severity, the following terms were used to describe disease symptoms: Nil, Trace, Slight, Moderate, Heavy, Severe, Dead.

The active material used was 3,5-bis(4-pyridylmethyl)-2H-1,3,5-tetrahydrothiadiazine-2-thione trihydrate, the product of Example 2.

I claim:
1. A method for the protection of plants from fungi comprisiing applying to said plants a fungicidally effec- tive amount in the range of from one to three pounds per acre of the compound:

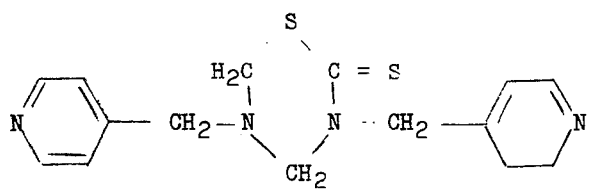

2. The method according to claim 1 wherein said compound is applied in the presence of a diluent therefor wherein the ratio of said compound to said diluent is from 1:99 to 95:5, respectively.

3. The method according to claim 2 wherein said compound is applied by spraying.

4. The method according to claim 2 wherein said compound is applied by dusting.

* * * * *